(12) United States Patent
Weigl et al.

(10) Patent No.: US 11,253,949 B2
(45) Date of Patent: Feb. 22, 2022

(54) DEVICE AND METHOD FOR WELDING TOGETHER TWO JOINING PARTNERS BY MEANS OF FRICTION STIR WELDING, WHICH PREVENTS THE JOINING PARTNERS BEING CONTAMINATED BY THE WELDING RESIDUE

(71) Applicant: GRENZEBACH MASCHINENBAU GMBH, Asbach-Baeumenheim (DE)

(72) Inventors: Markus Weigl, Donauwoerth (DE); Alexander Feineis, Donauwoerth (DE)

(73) Assignee: GRENZEBACH MASCHINENBAU GMBH, Asbach-Bäumenheim (DE)

( * ) Notice: Subject to any disclaimer, the term of this patent is extended or adjusted under 35 U.S.C. 154(b) by 443 days.

(21) Appl. No.: 16/305,081

(22) PCT Filed: Jun. 13, 2017

(86) PCT No.: PCT/DE2017/000164
§ 371 (c)(1),
(2) Date: Nov. 28, 2018

(87) PCT Pub. No.: WO2017/220062
PCT Pub. Date: Dec. 28, 2017

(65) Prior Publication Data
US 2020/0376590 A1 Dec. 3, 2020

(30) Foreign Application Priority Data
Jun. 21, 2016 (DE) ...................... 10 2016 007 585.6

(51) Int. Cl.
*B23K 20/12* (2006.01)
*B23K 101/20* (2006.01)

(52) U.S. Cl.
CPC ........ *B23K 20/1255* (2013.01); *B23K 20/126* (2013.01); *B23K 20/1235* (2013.01); *B23K 2101/20* (2018.08)

(58) Field of Classification Search
CPC .............. B23K 20/1255; B23K 20/122; B23K 20/129; B23K 2103/10; B23K 20/227;
(Continued)

(56) References Cited

U.S. PATENT DOCUMENTS 5,794,835 A    8/1998 Colligan
10,661,379 B1 * 5/2020 Larsson ............. B23K 20/1255
(Continued)

FOREIGN PATENT DOCUMENTS

DE     102012010836    6/2013
DE     202015005763    9/2015
(Continued)

*Primary Examiner* — Erin B Saad
(74) *Attorney, Agent, or Firm* — Duane Morris LLP; Gregory M. Lefkowitz (57) ABSTRACT

The invention relates to a method and to a device for welding together two joining partners by means of friction stir welding, which prevents the joining partners being contaminated by welding residue. The method comprises the following features: a welding head that can be integrated into any machine, said welding head being in the form of a spindle drive driven by a drive unit, comprising a mounting flange for securing the device assisting the welding process, and a clamping system for receiving a frustoconical-shaped tool having a welding and smoothing shoe for guiding a welding pin (11), a device (17) integrated into the welding and smoothing shoe for grinding the waste produced during the welding process, the waste produced during welding is then removed by means of one inlet channels for fluid arranged in the upper and/or lower area of the frustoconical-shaped tool for the fluid (20, 18) and a suction channel (19).

7 Claims, 8 Drawing Sheets

(58) Field of Classification Search
CPC .......... B23K 2101/006; B23K 2103/04; B23K 2103/05; B23K 2103/16; B23K 37/08; B23K 20/1215; B23K 20/26; B23K 20/123; B23K 20/125; B23K 20/126; B23K 20/1265; B23K 20/127; B23K 20/1275; B23K 20/1295; B23K 20/24; B23K 2103/12; B23K 2103/14; B23K 2103/18; B23K 31/02; B23K 9/1336
See application file for complete search history.

(56) References Cited

U.S. PATENT DOCUMENTS

| | | | |
|---|---|---|---|
| 2003/0098335 A1* | 5/2003 | Saeki | B23K 20/24 228/112.1 |
| 2015/0102087 A1 | 4/2015 | Foerg et al. | |
| 2017/0320161 A1 | 11/2017 | Weigl | |

FOREIGN PATENT DOCUMENTS

| | | |
|---|---|---|
| EP | 2561948 | 2/2013 |
| JP | 2004337860 | 12/2004 |
| JP | 2007029979 | 2/2007 |
| JP | 2007313520 | 12/2007 |
| JP | 2012000698 | 1/2012 |

* cited by examiner

DEVICE AND METHOD FOR WELDING TOGETHER TWO JOINING PARTNERS BY MEANS OF FRICTION STIR WELDING, WHICH PREVENTS THE JOINING PARTNERS BEING CONTAMINATED BY THE WELDING RESIDUE

CROSS-REFERENCE TO RELATED APPLICATIONS

This application is a § 371 national stage entry of International Application No. PCT/DE2017/000164, filed on Jun. 13, 2017, which claims priority to German Patent Application No. 10 2016 007 585.6, filed Jun. 21, 2016, the entire contents of which are incorporated herein by reference.

The invention relates to a device and a method for welding two joining partners by means of friction stir welding, which prevents the joining partners from being contaminated at all by welding residues. During friction stir welding, in the joining region of the materials which are intended to be welded by means of the friction between a rotating tool which rotates and which is at the same time moved in translation and which is applied with pressure, there is produced friction heat which places the material to be welded in a plasticized state. The tool is in this instance moved along the joining region and stirs the plasticized materials which are intended to be connected and which abut each other inside the seam. At the end of this seam, the tool is removed from the connection region and the weld seam can be directly loaded.

There is known from the prior art with regard to friction stir welding, inter alia, the previously published DE 10 2015 005 763 U1 from the Applicant itself which relates to a device for homogeneous welding of flatly bent structures by means of friction stir welding. With the device known from this publication, although a welding result can be achieved which complies with high quality demands, in this instance it cannot be fully excluded that, when the welding pin is pulled out during the ending of the welding operation, small occurrences of unevenness can be observed. In addition, it has to be taken into account that the edges of the structures which are intended to be welded do not adjoin each other without a joint but instead have small occurrences of unevenness which, during the welding operation in order to achieve a flat surface, make it necessary to supply "filler material".

Furthermore, there are also known from DE 10 2012 010 836 B3 which is also from the Applicant itself, a method and a device for improving the quality of the weld seam during friction stir welding with a computer program and a machine-readable carrier. This document is intended to increase the service-life of the friction stir tool from approximately 2 hours to 15 hours and to increase the quality of the joining seam in such a manner that no subsequent processing is required.

This object is achieved with a device having the following features:

a) a receiving plate (1) having a drive head (2) and a spindle bearing (4) for receiving a friction welding tip (9), wherein in the spindle bearing (4) a helically formed transport worm (6) which is used to remove material which is not required opens in openings (8) which lead in an oblique manner outward, b) the longitudinal axis of the spindle bearing (4) is inclined relative to the vertical at an angle of from 2.8 to 3.2 degrees, c) the sliding face of the rotation spindle comprises a flat sliding face (10) and particularly for welding curved seams a sliding face (11) which is curved per se and which is adjacent to two opposing sides and which is inclined at an acute angle relative to the sliding face (11), d) the friction welding tip (9) has the form of a truncated cone in which the covering face is raised in the center, and wherein the covering face of the truncated cone is formed by means of six trapezoidal surface pieces, of which three surface pieces in a state distributed in a uniform manner over the periphery face each other at an angle of 120 degrees and take up a proportion larger than ⅙ on the periphery of the circle.

With regard to the prior art, reference may further be made to EP 2 561 948 A1 which relates to a method and an installation for producing a flange/pipe flange element by means of friction stir welding. Such an installation addresses the problem of simplifying the centering of the flange and the pipe and also using the securing of the weld bath in addition to supporting the region which is softened by the friction stir welding for receiving the pressing forces during the friction stir welding and for centering the pipe in accordance with the longitudinal axis of the flanges with the elimination of measurement and setting-up operations with simultaneous reduction of production times, saving material and ensuring economic advantages. In this regard EP 2 561 948 discloses that the weld bath securing is constructed as a pneumatically clampable and releasable clamping and support plate for centering the pipe relative to the rotation axis of the flanges and for receiving the pressing forces during the friction stir welding, and that a sensor for scanning the butt joints between the pipe and flange is provided, and furthermore that a device for moving in and moving away a forming wedge in alignment with the tangential plane which is located horizontally above the rotation axis and which extends through the butt joint is provided in order to move the friction stir welding pin of the friction stir welding tool without perforations from the friction stir welded butt joint, wherein the sensor and the device for moving the forming wedge in and away is connected to the control unit.

In many cases, however, there are objections from the customer when welding two joining partners by means of friction stir welding with regard to the inevitable contamination of the welded components. In many applications, considerable costs may thereby arise as a result of necessary subsequent processing.

An object of the present invention is therefore to provide a device and a method in which during the operation of friction stir welding no contamination at all of the respective joining partners is carried out as a result of residues during the welding process. Costly subsequent processing of the weld seam is consequently dispensed with.

This object is achieved with the features in patent claim 1.

Device for welding two joining partners by means of friction stir welding, which prevents the joining partners from being contaminated at all by welding residues, having the following features:

a) a welding head which can be integrated in any machines in the form of a spindle drive (4) which is driven by a drive unit (1) having an assembly flange (5) for securing devices which support the welding process and a clamping system (8) for receiving a tool cover (9) having a welding and smoothing shoe (10) for guiding a welding pin (11), b) a device (14) which is integrated in the welding and smoothing shoe (10) for crushing the abraded material which is produced during the welding process, wherein means for removing this abraded material without contamination of the joining partners are provided, c) a device (7) which is integrated in the welding head for vertical axial adjustment of the tool cover (9), d) a temperature sensor (27) which is integrated in the tool cover (9), wherein the temperature of the tool cover (9) can be controlled by means of the supply and discharge of fluid. It is claimed that the crushing of the abraded material which is produced during the welding process is carried out by means of a cutting blade retention member (16) with a cutting blade (17) which is secured thereto. It is also claimed that there is arranged below the assembly flange (5) a sensor ring (6) which carries sensors for measuring force, for measuring the direct process parameters and/or for oscillation measurement, and that the abraded material which is produced during the welding process is removed by means of an influx channel for fluid (20, 18) which is arranged in the upper and/or lower region of the tool cover (9) and an outlet channel (19). It is also claimed that in the welding head at least one cable channel (22) leads to the sensors which are integrated in the welding head, and a method according to patent claim 6

Method for welding two joining partners by means of friction stir welding, which prevents the joining partners from being contaminated at all by welding residues, having the following method features:

a) in a welding head which can be integrated in any machines in the form of a spindle drive (4) which is driven by a drive unit (1) having an assembly flange (5) for securing devices which support the welding process and a clamping system (8) for receiving a tool cover (9) having a welding and smoothing shoe (10) for guiding a welding pin (11), it is ensured that in the welding and smoothing shoe (10) an integrated device (14) is provided for crushing the abraded material which is produced during the welding process, b) the abraded material which is produced during the welding process is then removed by means of an influx channel for fluid (20, 18) which is arranged in the upper and/or lower region of the tool cover (9) and an outlet channel (19) and that the crushing of the abraded material which is produced during the welding process is carried out by means of a cutting blade retention member (16) with a cutting blade (17) which is secured thereto, and a computer program with a program code for implementing the method steps according to either claim 6 or 7, when the program is carried out on a computer. There is also claimed a machine-readable carrier having the program code of a computer program for carrying out the method according to either claim 6 or 7, when the program is carried out on a computer.

Figure 1:
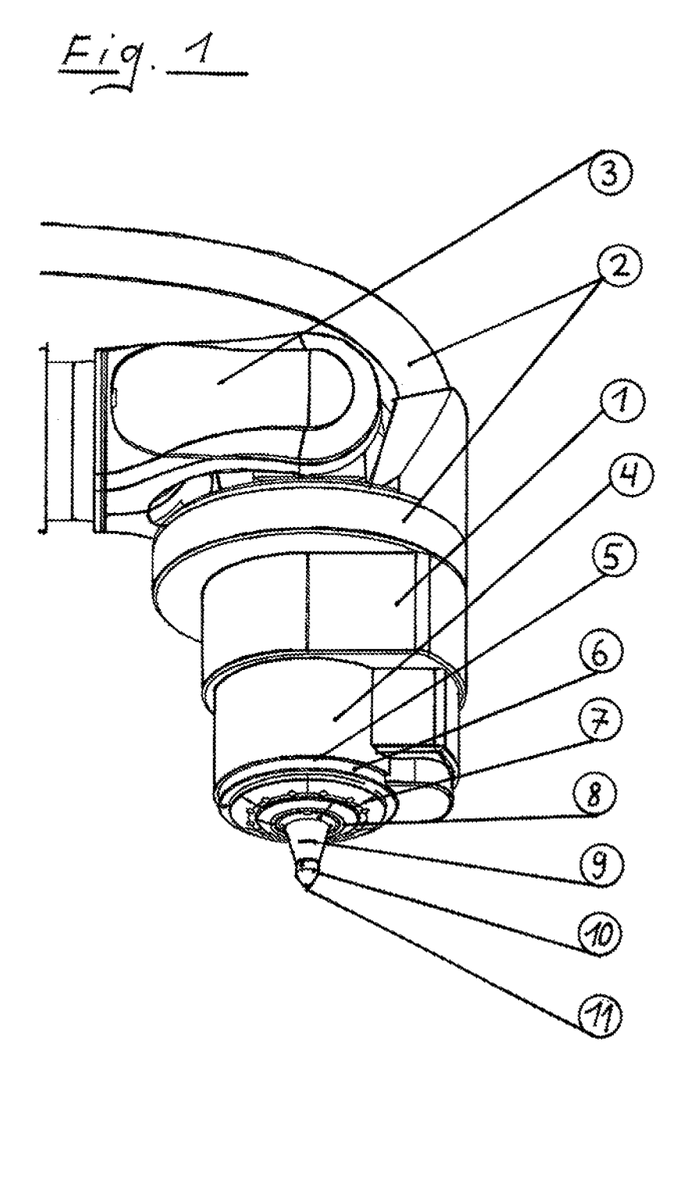
FIG. 1 is a perspective illustration of the welding head.

The device according to the invention is described in greater detail below:

In the drawings:

FIG. 1 is a perspective illustration of the overall welding head according to the invention.

The term "overall" was selected since the entire process data acquisition and process control is integrated in the welding head. The spindle is to some degree a "rotating tool retention member", wherein the welding head can be integrated in any machines. At the right-hand side, in FIG. 1 the control line and the energy supply line 2 for the drive unit of the spindle can be seen, wherein the entire welding head can be guided, for example, by a robot 3 and the spindle gear 4 has an assembly flange 5 at the lower side thereof. There is arranged below the assembly flange 5 a sensor ring 6 which, for example, carries sensors for force measurement, for the measurement of direct process parameters and/or oscillation measurement. For direct measurement of the oscillations produced on the shoulder, measurement heads are arranged between the spindle and the welding head. This results in fewer error effects, for example, as a result of an imbalance in the spindle. A unit 7 for axial adjustment of the tool cover is supported below the sensor ring 6. It enables precise displacement of the tool cover in an axial direction. There further follow a clamping system 8 for the welding tool having a tool cover 9 and a welding and smoothing shoe 10 and the welding pin 11 thereof.

Figure 2:
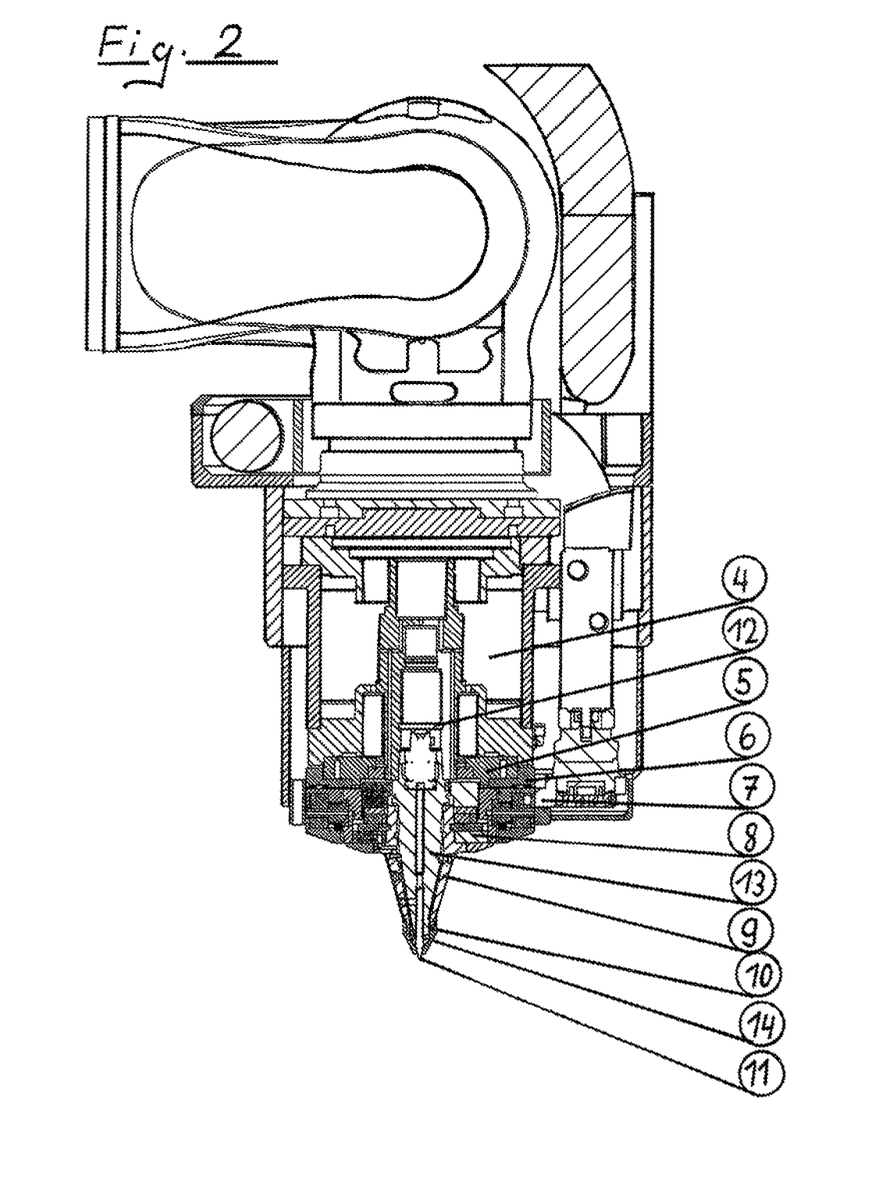
FIG. 2 is a section through the welding head of FIG. 1.

FIG. 2 is a section through the welding head of FIG. 1.

In this instance, in the right-hand upper region the spindle gear 4 which extends over the cross-section and the assembly flange 5 which extends transversely relative to the spindle thread from FIG. 1 are indicated. Below the assembly flange 5, the inner region of the sensor ring 6 can be seen, whilst in a state arranged below it the components of the unit 7 for axial adjustment can be seen in cross-section. The centrally supported tool cover 9 is surrounded by the clamping system 8 for the welding tool. In the rotation axis of the tool cover 9 there is supported a spindle 12 which in the extension thereof extends through a tool shaft 13 in the tool cover 9 and which carries a welding pin 11 at the end thereof. The welding pin 11 is guided in a welding and smoothing shoe 10. In the welding and smoothing shoe 10 in the left side region a device 14 for crushing or for machining the abraded material during the friction stir welding process is indicated.

Figure 3:
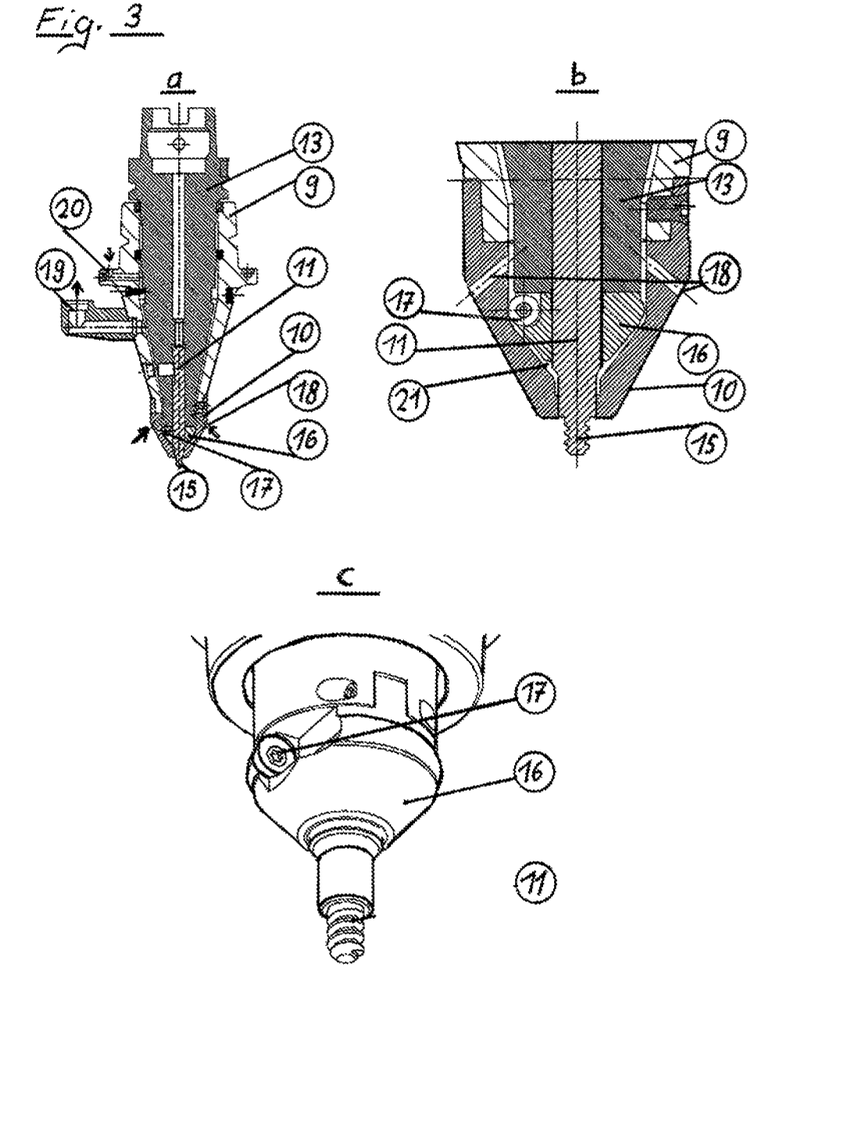
FIG. 3a is a section through the tool cover.
FIG. 3b is a section through the lower portion of the tool cover.
FIG. 3c is a perspective view of the lower portion of the tool cover without the welding and smoothing shoe 10.

FIG. 3a is a section through the tool cover.

In addition to the tool cover 9 with the inner tool shaft 13 and the welding pin 11 with the pin tip 15 thereof, in this instance in the welding and smoothing shoe 10 at the left and right side of the welding and smoothing shoe 10 as shown in this instance so-called lower influx channels 18 for fluid are illustrated. These lower influx channels 18 may naturally be distributed all the way around the welding and smoothing shoe 10 and serve to supply fluid for flushing away abraded material or excess process material which has been produced during the process of friction stir welding. These influx channels 18 are illustrated only schematically and by way of example. The influx channels 18 on the welding and smoothing shoe 10 also have a flow-producing function for the incoming fluid.

The device 14 shown in FIG. 2 for grinding or machining, more specifically for crushing this abraded material is characterized in FIG. 3a by a cutting blade retention member 16 of this device with an associated cutting blade 17. Devices for supplying fluid in the influx channel(s) 18 are not shown in this instance for reasons of clarity.

At the left-hand side of the tool cover 9 an outlet channel 19 for fluid and an upper influx channel 20 for fluid can be seen.

FIG. 3b is a section through the lower portion of the tool cover drawn to an enlarged scale. Also in this instance, in the upper region the tool cover 9 is indicated with the inner tool shaft 13 and the centrally guided welding pin 11 and the pin tip 15 thereof. The two influx channels 18 for fluid which are also shown in FIG. 3a are in this instance illustrated even more clearly. In FIG. 3b, the cutting blade retention member 16 with the cutting blade 17 thereof can be seen particularly clearly. In the lower region of the illustrated welding pin 11, in FIG. 3b in the welding and sliding shoe 10 at the left-hand side a gap 21 for abraded material can be seen.

FIG. 3c is a perspective view of the lower portion of the tool cover without the impeding view of the welding and smoothing shoe 10. The cutting blade retention member 16 which is placed on the welding pin 11 in an annular manner with the cutting blade 17 which is retained or supported thereby for the device for grinding or for machining or generally speaking crushing the abraded material produced during the friction welding can be clearly seen in this instance.

Figure 4:
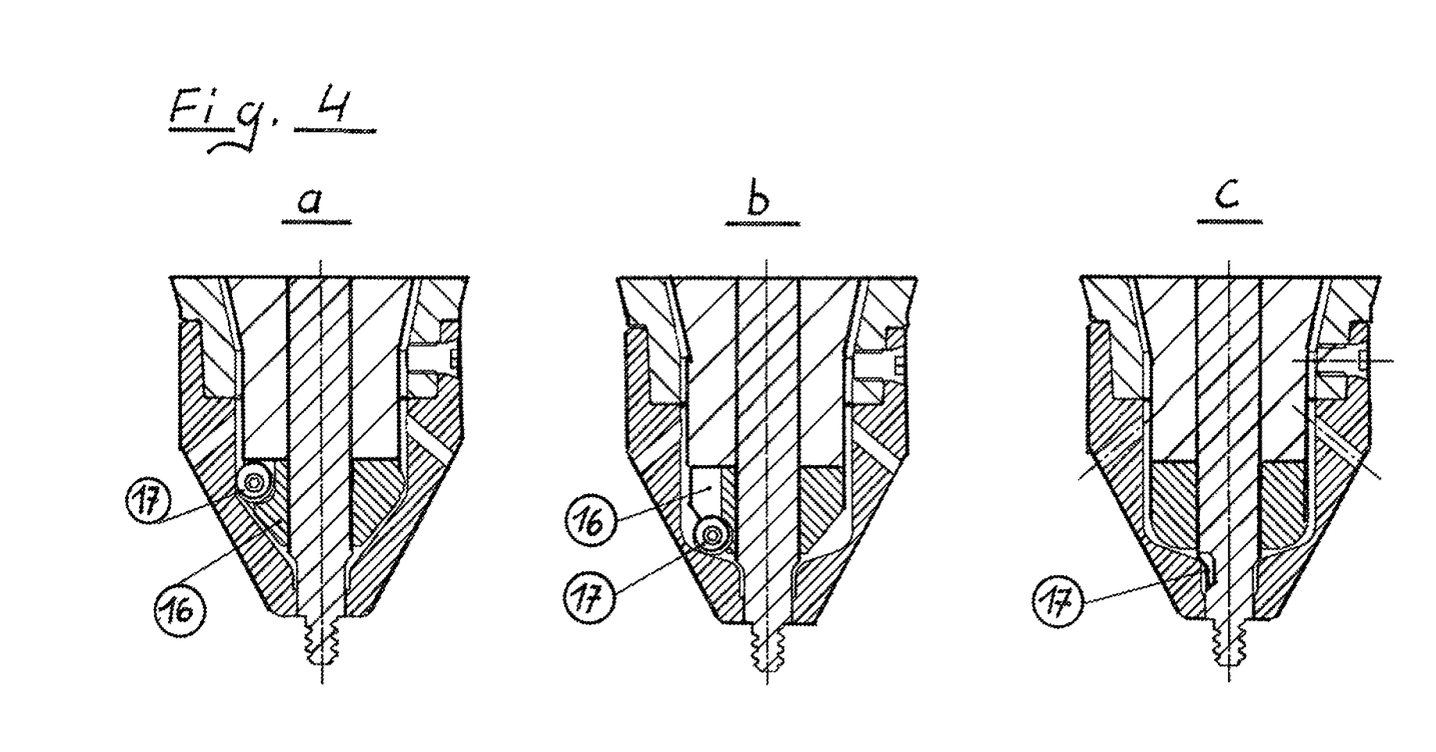
FIG. 4a is a section through the lower portion of the tool cover with a cutting blade 17 located at the top.
FIG. 4b is a section through the lower portion of the tool cover with the cutting blade 17 at the bottom.
FIG. 4c is a section through the lower portion of the tool cover with the cutting blade 17 at the bottom in the region of the pin shaft.

FIGS. 4a, 4b and 4c represent different possibilities for arranging a cutting blade 17 in the region of the welding and sliding shoe. The shape of the cutting blade 17 is illustrated in this instance only by way of example. It may also be triangular, square or of any geometric shape.

FIG. 4a is a section through the lower portion of the tool cover with the cutting blade 17 at the top in the cutting blade retention member 16.

FIG. 4b is a section through the lower portion of the tool cover with the cutting blade 17 at the bottom in the cutting blade retention member 16.

FIG. 4c is a section through the lower portion of the tool cover with the cutting blade 17 at the bottom in the region of the pin shaft.

All the cutting blade positions illustrated can be freely combined with each other. Consequently, combinations between axial and radial cutting or crushing can also be produced.

Figure 5:
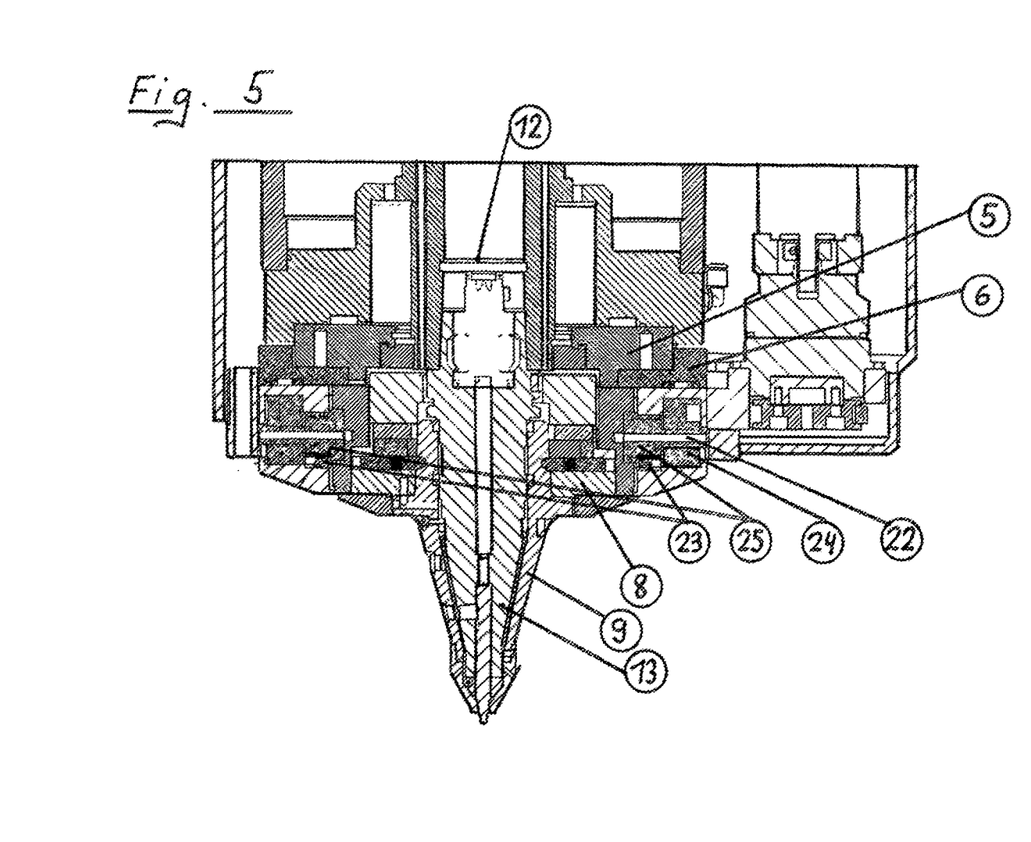
FIG. 5 is a section through the unit 7 for axial adjustment of the tool cover.

FIG. 5 is a section through the unit 7 for axial adjustment of the tool cover. In the center axis drive unit of the entire welding head, the spindle axis 12 can be seen in the tool shaft 13 inside the upper portion of the tool cover 9. Rotationally symmetrically with respect to the spindle 12, at the left and right upper side of FIG. 5 it is possible to see the assembly flange 5 which is known from the upper portion of FIG. 2 and which connects the spindle gear 4 to the sensor ring 6, wherein the sensor ring 6 is indicated at the right-hand side in this instance. The clamping system for the tool cover 9 can be seen in section rotationally symmetrically relative to the tool cover 9 at the left and right side. Similarly rotationally symmetrically at the left and right side of the clamping system 8 for the welding tool, the two portions (visible in section) of an adjustment nut 24 for the travel of the axial adjustment 7 can be seen, wherein at the left-hand side at both sides of the adjustment nut 24 two guiding elements 25 are indicated, of which at least two are provided. The pretensioning elements 23 which are supported in section in each case beside the guiding elements 25 enable stepless adjustment of the travel for axial adjustment of the tool cover. Further details can be seen in the illustration of FIG. 6. At the right-hand side, a cable channel 22 for supplying signals to the sensors which lead to the tool is indicated.

Figure 6:
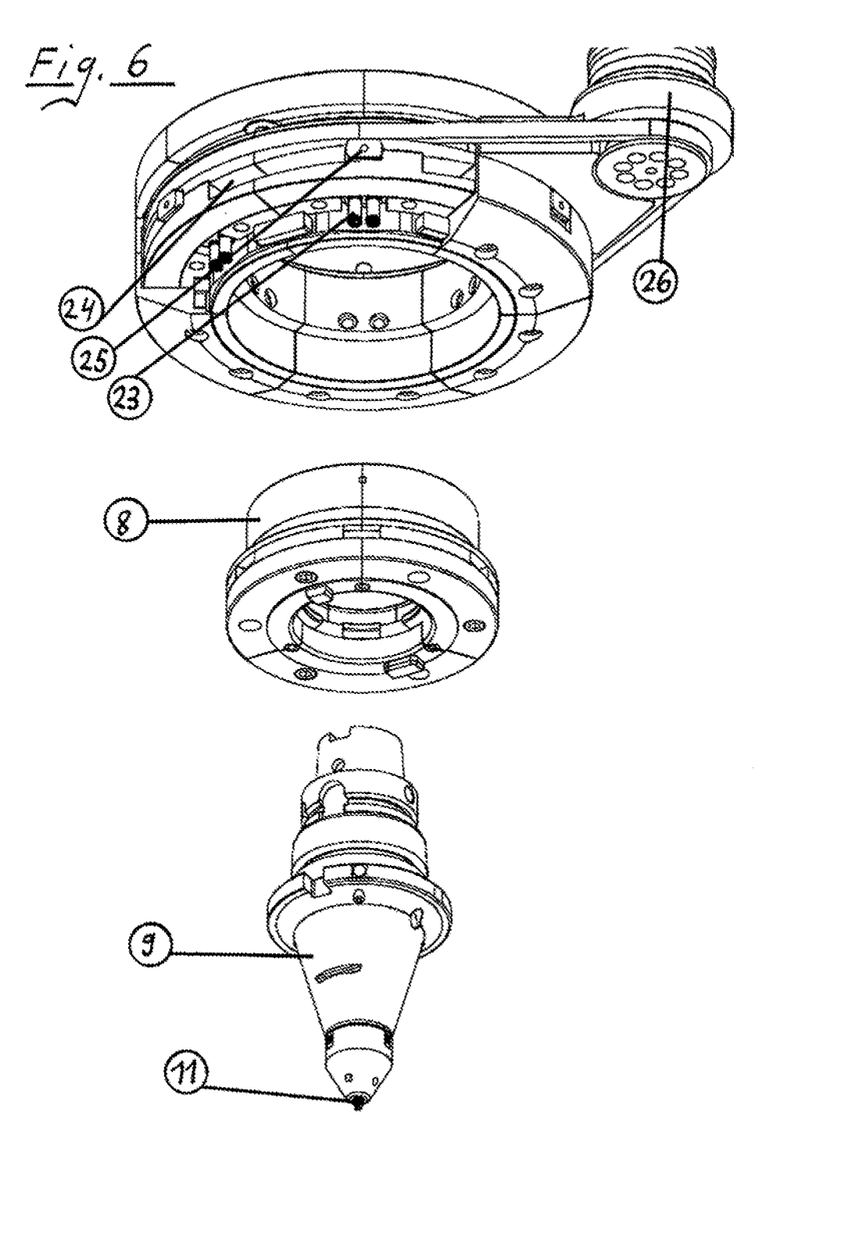
FIG. 6 is a perspective illustration of the axial adjustment 7.

FIG. 6 is a perspective illustration of the axial adjustment 7. In this instance, the axial adjustment 7 is illustrated separately in its position in the overall construction of the welding head according to the invention. In the right foreground, a guiding element 25 can be seen, of which as a result of the guiding function thereof at least two must be present. These guiding elements 25 perform to some degree the function of a thread, whilst the annular character of the adjustment nut 24 becomes clear in this illustration. Furthermore, in the illustration of FIG. 6, three pretensioning elements 23 can be seen, of which the one shown on the left side is indicated. The adjustment drive 26 is used as a drive for the entire axial adjustment 7.

Figure 7:
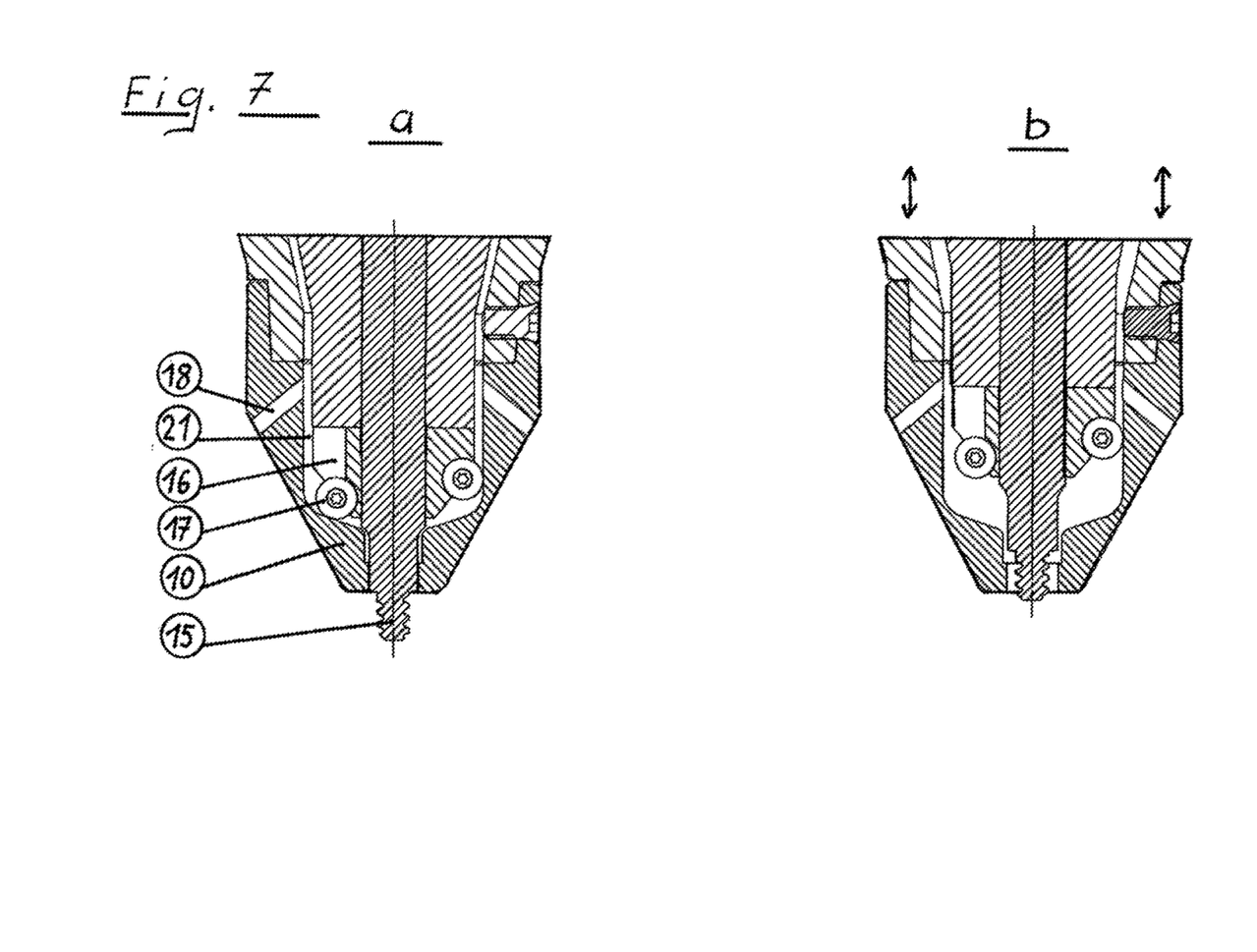
FIG. 7a is a section through a cleaning operation with lifting from above.
FIG. 7b is a section through the cleaning operation with lifting from below.

FIG. 7 show a combination of axial and radial cutting blades.

FIG. 7a is a section through a cleaning operation with travel from above.

In addition to the surrounding welding and smoothing shoe 10 and the pin tip 15 which is supported therein, in this instance a cutting blade retention member 16 can be seen with the cutting blade 17 thereof. At the left side of the cutting blade retention member 16, a narrow gap, the gap 21 for abraded material or in general terms crushed process material, is shown, which gap results in this material being able to be introduced outward via a gap 18 by means of a lifting action in the upper region. The removal of the crushed material in the gap 21 is controlled by means of flow-influencing/producing geometries which rest at the inner side of the cover and at the outer side of the friction pin receiving member and the cutting blade retention member.

FIG. 7b is a section through a cleaning operation with travel from below.

In this instance, lowering the tool cover results in the process material which has been produced by the welding pin being able to be introduced upward and consequently via one or more of the gaps shown outward.

Figure 8:
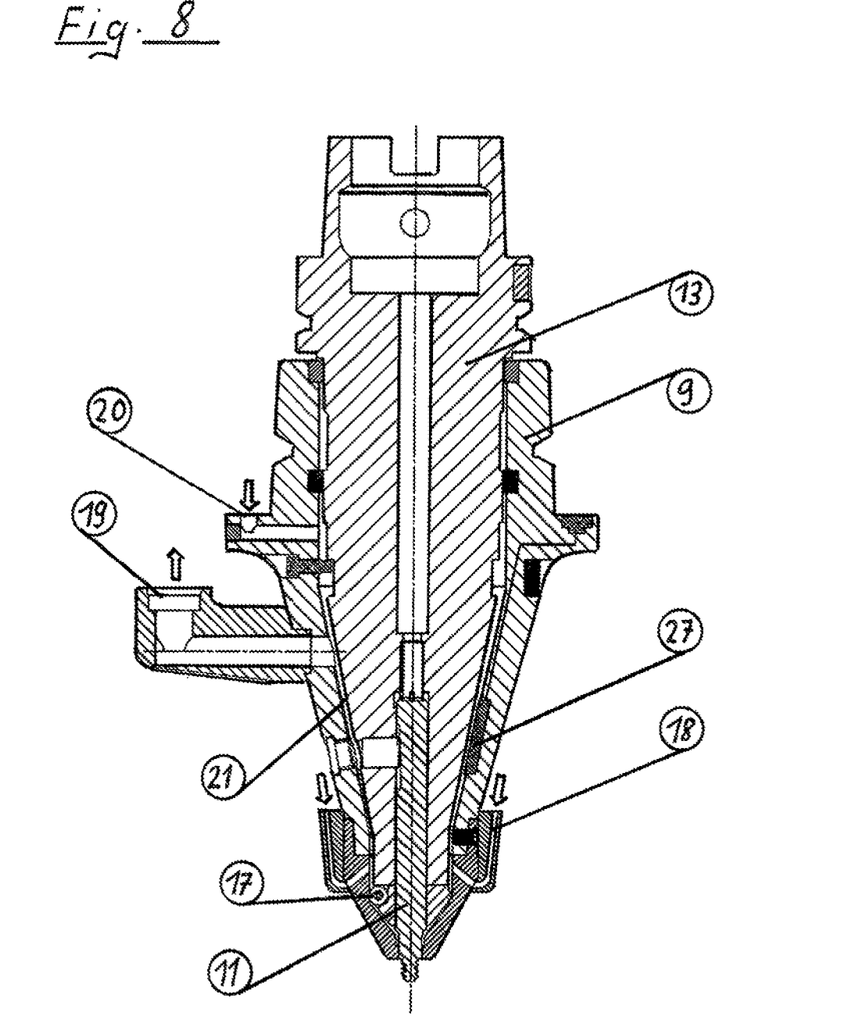
FIG. 8 is a section through the tool cover with the illustration of a plurality of functions.

FIG. 8 is a section through the tool cover with the illustration of a plurality of functions. In addition to the tool cover 9 with the tool shaft 13, the welding pin 11 and the cutting blade 17 with the gap 21 for abraded material, in this instance at the left side in the tool cover 9 two influx channels for fluid, that is to say, the influx channel 20 in the upper region and the influx channel 18 in the lower region can be seen. The larger outlet channel 19 supplements this installation. This arrangement not only serves to control the transport of the abraded material but also to control overall the operating temperature of the entire process during the friction stir welding using a temperature sensor 27 which is shown. There is provided according to the invention an additional control of the fluid flow and the fluid distribution as a result of flow-influencing geometries at the outer side and inside the components tool cover, pin receiving member, welding and sliding shoe, that is to say, all the components which come into contact with fluid.

LIST OF REFERENCE NUMERALS

1 Drive unit for the spindle 12
2 Control line and energy supply line
3 Robot
4 Spindle gear
5 Assembly flange 6 Sensor ring (force measurement, oscillation measurement)
7 Unit for axial adjustment of the tool cover
8 Clamping system for the welding tool
9 Tool cover
10 Welding and smoothing shoe
11 Welding pin
12 Spindle
13 Tool shaft (pin shaft)
14 Device for grinding or machining the abraded material
15 Pin tip
16 Cutting blade retention member of the device 14 for grinding or machining, generally speaking crushing
17 Cutting blade
18 Influx channel for fluid (bottom)
19 Outlet channel
20 Influx channel for fluid (top)
21 Gap for abraded material
22 Cable channel for sensors which lead to the tool
23 Pretensioning element for axial adjustment 7
24 Adjustment nut for the travel of the axial adjustment 7
25 Guiding element (thread function)
26 Adjustment drive
27 Temperature sensor

The invention claimed is:

1. A device for welding two joining partners by friction stir welding, which prevents the joining partners from being contaminated by welding residues comprising:
   a welding head comprising: a spindle drive driven by a drive unit, an assembly flange, a clamping system, a tool cover, a welding and smoothing shoe and a welding pin, the clamping system configured to receive the tool cover and the welding and smoothing shoe configured to guide the welding pin,
   a removal device comprising an influx channel integrated in the welding and smoothing shoe for crushing abraded material produced during a welding process and removing the abraded material,
   an adjustment device comprising a guide element and an adjustment nut is integrated in the welding head for vertical axial adjustment of the tool cover, and
   a temperature sensor integrated in the tool cover, wherein a temperature of the tool cover is controlled by a supply and discharge of fluid.

2. The device as claimed in claim 1, wherein the removal device comprises a cutting blade retention member with a cutting blade secured thereto to crush the abraded material produced during the welding process.

3. The device as claimed in claim 1, a sensor ring is positioned below the assembly flange, the sensor ring comprising sensors for measuring force, for measuring direct process parameters or for oscillation measurement.

4. The device as claimed in claim 1, wherein the removal device comprises the influx channel for fluid arranged in an upper or lower region of the tool cover and an outlet channel for removal of the abraded material produced during the welding process.

5. The device as claimed in claim 1, wherein the welding head comprises at least one cable channel for supplying signals to sensors integrated in the welding head.

6. A method for welding two joining partners by friction stir welding, which prevents the joining partners from being contaminated by welding residues, the method comprising:
   crushing abraded material produced during a welding operation using a removal device integrated in a welding and smoothing shoe of a welding head, the welding head comprising a spindle drive driven by a drive unit, an assembly flange, a tool cover, and a clamping system configured to receive the tool cover and the welding and smoothing shoe, and
   removing the abraded material produced during the welding operation using an influx channel for fluid positioned in the upper or lower region of the tool cover and an outlet channel.

7. The method as claimed in claim 6, wherein the crushing of the abraded material which is produced during the welding process is performed by a cutting blade retention member with a cutting blade secured thereto.

* * * * *